United States Patent Office 2,808,433
Patented Oct. 1, 1957

2,808,433

BENZENE DICARBOXYLIC ACID DERIVATIVES

William S. Struve, Carney's Point, N. J., assignor to E. I. du Pont de Nemours and Company, Wilmington, Del., a corporation of Delaware No Drawing. Application August 21, 1953,
Serial No. 375,834

7 Claims. (Cl. 260—518)

This invention relates to new benzene dicarboxylic acid derivatives that may be diazotized and coupled to produce azo dyes. It relates preferably to such new derivatives of terephthalic acid.

It is an object of this invention to prepare a new series of benzene dicarboxylic acid derivatives having the structural formula

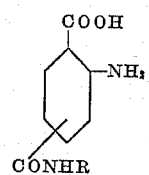

wherein R is a nucleus from the group consisting of benzene, naphthalene and substituted benzene and naphthalene nuclei and wherein the substituents of the substituted benzene and naphthalene nuclei are taken from the class consisting of alkyl radicals of 1 to 6 carbon atoms, alkoxy radicals of 1 to 6 carbon atoms, chlorine, bromine and nitro radicals, and the —CONHR group may be in a position with respect to the carboxy group consisting of the 4, 5, and 6 positions, preferably in the 4 position.

This new series of benzene dicarboxylic acid derivatives may be diazotized and coupled to produce azo dyes. For example, it may be diazotized and coupled to 3-hydroxy-2-naphthoic acid to produce an azo dye and, if desired, reacted with a metal compound such as a manganese compound to produce as an insoluble pigment the manganese salt of the azo dye. Such new dyes and pigments are described and claimed in copending application Serial No. 375,835, filed August 21, 1953.

The new benzene dicarboxylic acid derivatives of this invention may be produced by several alternative methods from commercially available materials using conventional reactions of organic syntheses. Any of the three known benzene dicarboxylic acids may be used as starting materials, i. e., (1) phthalic acid,

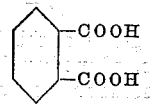

(2) isophthalic acid,

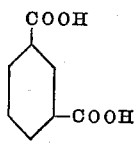

or (3) terephthalic acid,

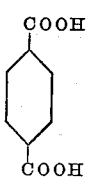

the latter being preferred.

Using terephthalic acid as the starting material, a number of possible routes for the synthesis of the new dicarboxylic acid derivatives of this invention are shown structurally as follows:

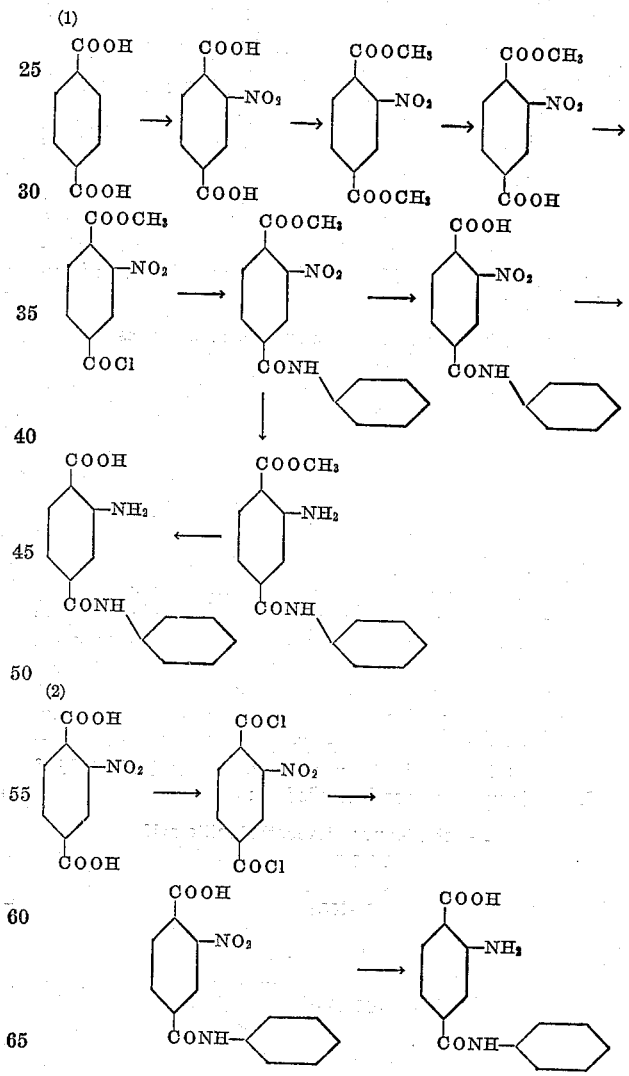

(3)

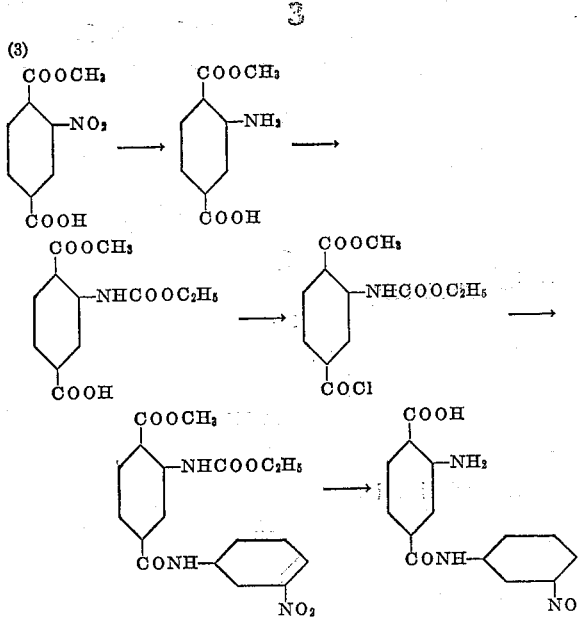

The following examples describe several processes for the production of the new compounds of this invention.

*Example I*

A mixture of 80 grams of 2-nitroterephthalic acid 1-methyl ester (made by nitration of terephthalic acid, methylation and partial hydrolysis, as described by Wegscheider, Monatschefte für Chemie, 23, 411 (1902)), 800 cc. of toluene, 107 grams of thionyl chloride and 2 drops of pyridine was heated at 90° C. and held for four hours after a clear solution was obtained. The mixture was concentrated to half volume by distillation under reduced pressure, keeping the pot temperature at 30–40° C. Then a solution of 76.5 grams of o-toluidine in 200 cc. of toluene was added below 40° C. and the charge heated at 40–50° C. for two hours. Ice and 54 cc. of 37% hydrochloric acid was added and the solid was filtered off, washed with water, and dried, giving 104 grams of colorless product; M. P. 137–140° C. This product was identified as:

2'-methyl-2-nitroterephthalanilic acid methyl ester

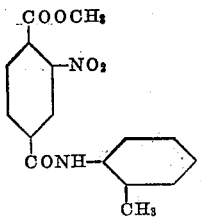

A mixture of 80 grams of the above methyl ester, 60 cc. of 5 N sodium hydroxide solution and 400 cc. of water was boiled for ten minutes and the clarified reaction mixture was acidified with concentrated hydrochloric acid. The precipitated product was filtered off, washed, and dried, giving 73 grams; M. P. 211–214° C. After recrystallization from dilute methanol the product melted at 214–216° C., resolidified and melted at 231° C. This product was identified as:

2'-methyl-2-nitro-terephthalanilic acid

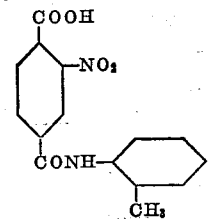

Ninety (90) grams of this product was dissolved in 900 cc. of water by means of 30% NaOH solution and the mixture was adjusted so that it was alkaline to Brilliant Yellow but not alkaline to phenolphthalein. The mass was hydrogenated at 70–80° C. at 400–500 pounds pressure in the presence of 4.5 grams of palladium-charcoal catalyst. The catalyst was filtered off and the filtrate was acidified with hydrochloric acid. The product was filtered off, washed, and dried, giving 76 grams; M. P. 221–224° C. This product was identified as:

2-amino-2'-methylterephthalanilic acid

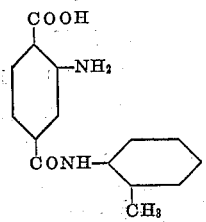

*Example II*

To a slurry of 250 grams of 2-nitroterephthalic acid 1-methyl ester in 500 cc. of water was added dropwise with stirring 115 cc. of 30% NaOH solution diluted to 1300 cc. The filtered solution was hydrogenated at 40° C. at 200–300 pounds pressure in the presence of 10 grams of palladium-charcoal catalyst. Then, 22 grams of sodium carbonate was added and the reaction mass was filtered to remove the catalyst. To the solution was added 135 grams of ethyl chlorocarbonate and the mass was stirred at room temperature for three hours, keeping the reaction alkaline by additions of sodium carbonate. At the end of the first hour's stirring, an additional 14 grams of ethyl chlorocarbonate was added. The clarified reaction mass was acidified and the product was filtered off, washed and dried. The dried material was slurried hot in 2700 cc. of methanol and filtered from the cooled mass giving 164 grams of a product having a M. P. of 233–235° C. This product was identified as:

2-carbethoxyaminoterephthalic acid-1-methyl ester

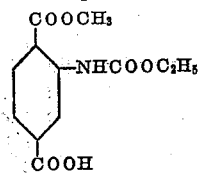

A mixture of 150 grams of the above product, 1500 cc. of toluene, 4 drops of pyridine and 120 cc. of thionyl chloride was heated at 90° C. for seven hours. Then, the mass was concentrated to half volume by distillation under reduced pressure, keeping the pot temperature at 30–40° C. A mixture of 171 grams of 5-nitro-o-toluidine in 2100 cc. of toluene was added and the mixture heated at 40–50° C. Ice and 75 cc. of 37% hydrochloric acid were added and the solid was filtered off, washed first with water and then with methanol and dried, giving 172 grams; M. P. 231–232° C. This product was identified as:

2-carbethoxyamino-2'-methyl-5'-nitroterephthalanilic acid, methyl ester

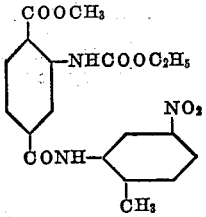

A mixture of 170 grams of this identified product, 855 cc. of water, 250 cc. of methanol, and 255 cc. of 5 N sodium hydroxide solution was boiled for 20 minutes and the clarified mass was acidified with 130 cc. of 37% hydrochloric acid and the precipitated product was filtered off, washed and dried, giving 123 grams of tan solid; M. P. 250–277° C. After slurrying several times with hot methanol, the product melted at 284–292° C. This product was identified as:

2-amino-2'-methyl-5'-nitroterephthalanilic acid

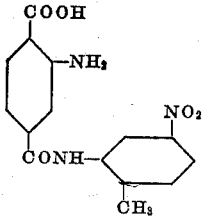

Clear identification of the parent member (2-amino-terephthalanilic acid) was established in the following manner:

The 2-amino-terephthalanilic acid was titrated with alkali to give the neutral equivalent value of 253.5 compared with the theoretical equivalent of 256. Again, a sample of this compound was titrated with sodium nitrite in acid solution to give the "nitrite value," a standard method of analysis for diazotizable amines. 97.75% of the theoretical amount of nitrite was consumed.

The compound 2-amino-2',4'-dimethoxy-5'-chloro terephthalanilic acid was analyzed for chlorine, giving a chlorine content of 10.05% compared to the theoretical value of 10.13%.

The following derivatives of terephthalanilic acid, characterized by melting point, have been prepared and identified by the methods described below:

| Amine Used R NH₂ | Nitro Ester COOCH₃ / NO₂ / CONHR | Nitro Acid COOH / NO₂ / CONHR | Amino Acid COOH / NH₂ / CONHR |
|---|---|---|---|
| | °C. | °C. | °C. |
| Aniline | 140–143 | 193–195.5 | 262–264.5 |
| o-Toluidine | 137–140 | 214–216 | 223–225.5 |
| m-Toluidine | 125.5–127 | | 241–242.5 |
| p-Toluidine | 135.5–137 | 236–237 | 270–272 |
| o-Anisidine | 133–125 | 184–186 | 234–237 |
| p-Anisidine | 129.5–131 | 221–222 | 263–265 |
| o-Chloraniline | 122–124 | 206 | 238–240 |
| m-Chloraniline | 143–145 | 217–219 | 241–243 |
| p-Chloraniline | 182–184 | 278–280 | 290.5–293 |
| 3,4-xylidine | 169–171 | 235–237 | 252–253.5 |
| m-Xylidine | 124–126 | 213.5–215.5 | 237–240.5 |
| p-Xylidine | 135–136 | 205.5–206.5 | 253–256 |
| 5-chloro-o-toluidine | 130–132 | 200–201 | 249–252 |
| α-Naphthylamine | 138–142 | 242–244 | 258–260 |
| β-Naphthylamine | 156–158 | 244–246 | 279.5–281 |
| 2,4-dimethoxy-5-chloraniline | 194–196 | 241.5–242.5 | 257.5–260 |
| Cresidine (2-amino-4-methyl anisole) | 116.5–119.5 | 242.5–244 | 255–257 |
| 2,5-dimethoxy aniline | 121.5–123 | 225.5–227.5 | 231.5–232.5 |
| 3-chloro-4-methyl aniline | 153.5–157 | 236–238 | 261.5–263 |
| m-Amino-benzotrifluoride | 120–122 | 211–212.5 | 227–232 |

*Example III*

A mixture of 100 grams of 4-nitroisophthalic acid-3-methyl ester (Axer, Monatshefte für Chemie, 41, 161 (1920)), 1000 cc. of toluene, 2 drops of pyridine and 80 cc. of thionyl chloride was heated at 90° C. for seven hours and the mass was concentrated to about 500 cc. by distillation under reduced pressure, keeping the pot temperature below 40° C. Then a solution of 85 grams of aniline in 500 cc. of toluene was added over a one-half hour period below 40° C. and the charge was heated at 40–50° C. for two hours. Ice and 75 cc. of concentrated HCl were added and the solid was filtered off, washed well with water and dried, giving 114 grams; M. P. 134–138° C. after one recrystallization from methanol. This product was identified as:

methyl 6-nitroisophthalanilate

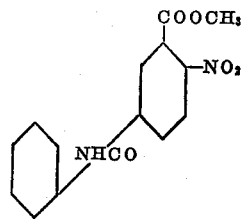

A mixture of 112 grams of the above compound, 84 cc. of 5 N sodium hydroxide solution and 560 cc. of water was boiled for ten minutes and the clarified solution was acidified. The precipitated product was filtered off, washed, and dried, giving 102 grams; M. P. 247° C., identified as the following product:

6-nitroisophthalanilic acid

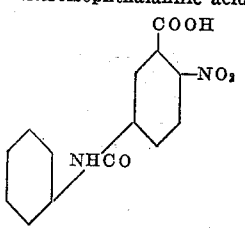

A solution of 100 grams of this compound in 1000 cc. of water and 36.3 cc. of 30% sodium hydroxide solution was hydrogenated in the presence of 5 grams of palladium-charcoal catalyst at 70–80° C. and at 400–500 pound pressure. The catalyst was filtered off and the solution acidified, giving 83 grams of product; M. P. 279–281° C. This product was identified as:

6-aminoisophthalanilic acid

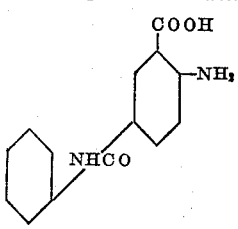

*Example IV*

The methyl ester, nitro acid and amino acid derivatives of the compound resulting from the replacing of aniline in Example III with 2,4-dimethoxy-5-chloraniline were prepared and identified. These derivatives had the following melting points:

|  | M. P. ° C. |
|---|---|
| Methyl ester | 178–179 |
| Nitro acid | 266–268 |
| Amino acid | 257–259 |

*Example V*

Sodium 6-aminophthalanilate was prepared by catalytic hydrogenation of the sodium salt of 6-nitrophthalanilic acid. The free acid was not isolated.

The products of this invention are useful as diazo components in the preparation of azo dyes with unusually good properties of light-fastness and freedom from bleed.

Reference in the specification and claims to parts, proportions and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:
1. A compound having the formula:

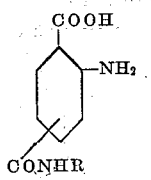

wherein R is a nucleus from the group consisting of benzene, naphthalene and substituted benzene and naphthalene nuclei and wherein the substituents of the substituted benzene and naphthalene nuclei are taken from the class consisting of alkyl radicals of 1 to 6 carbon atoms, alkoxy radicals of 1 to 6 carbon atoms, chlorine, bromine and nitro radicals, and the —CONHR group may be in a position, with respect to the carboxy group, consisting of the 4, 5 and 6 positions.

2. A compound having the formula:

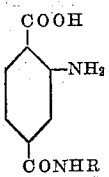

wherein R is a nucleus from the group consisting of benzene, naphthalene and substituted benzene and naphthalene nuclei and wherein the substituents of the substituted benzene and naphthalene nuclei are taken from the class consisting of alkyl radicals of 1 to 6 carbon atoms, alkoxy radicals of 1 to 6 carbon atoms, chlorine, bromine and nitro radicals.

3. 2-amino-2′-methyl terephthalanilic acid.
4. 2 - amino - 2′,4′ - dimethoxy - 5′ - chloro - terephthalanalic acid.
5. 6-aminoisophthalanilic acid.
6. 2-amino-2′-methyl-5′-nitroterephthalanilic acid.
7. 2-amino-terephthalanilic acid.

References Cited in the file of this patent
UNITED STATES PATENTS

| | | |
|---|---|---|
| 2,088,667 | Rose | Aug. 3, 1937 |
| 2,159,605 | Schumacher et al. | May 23, 1939 |

OTHER REFERENCES

Meyer: Chem. Abs., vol. 13 (1919), page 431.